June 13, 1961  J. J. KURLAND ET AL  2,987,800
METHOD OF MANUFACTURING A MINIATURE CAPACITOR
Filed June 10, 1957  4 Sheets-Sheet 1
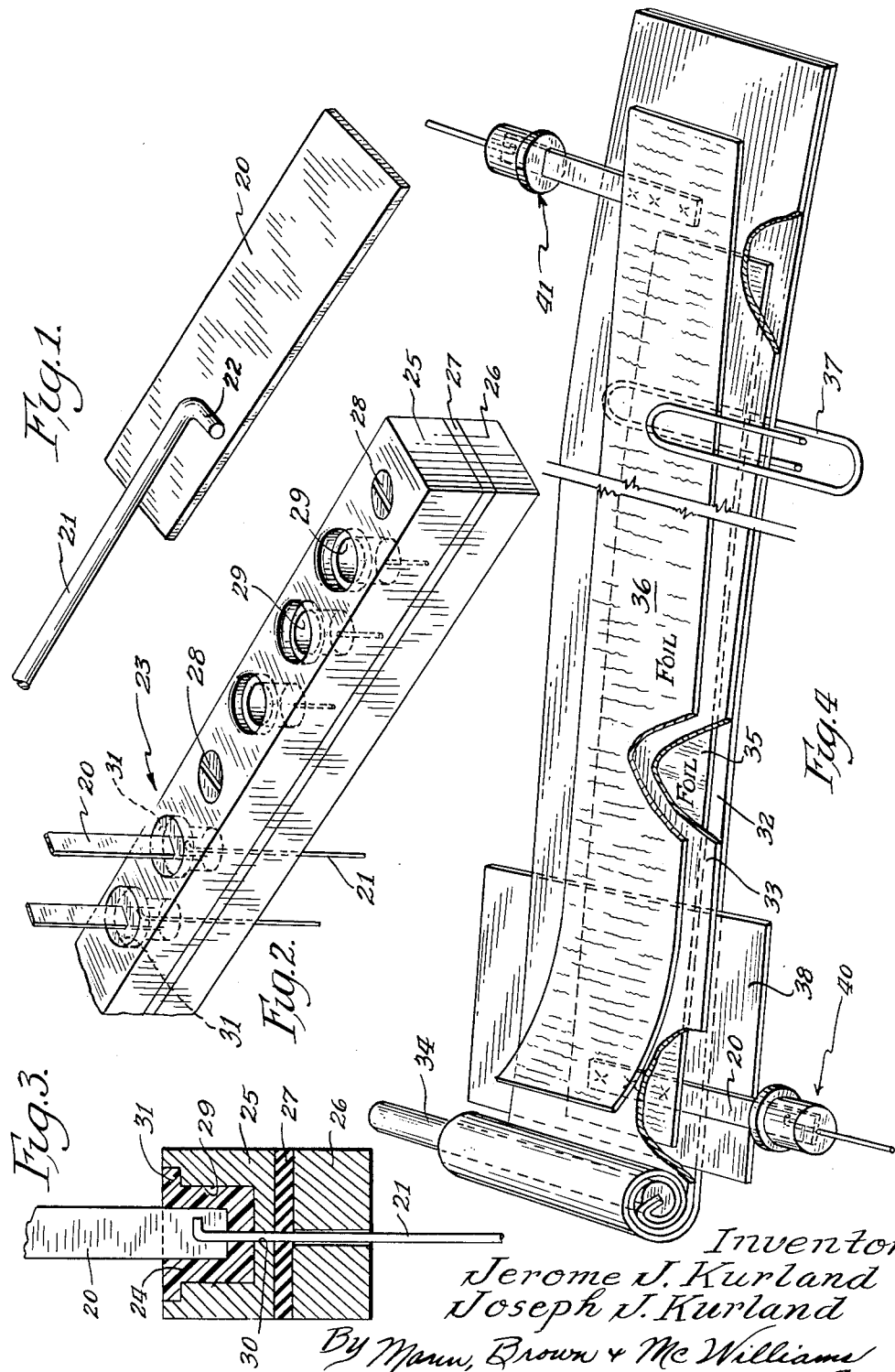
Inventors
Jerome J. Kurland
Joseph J. Kurland
By Mann, Brown & McWilliams
Attys.

June 13, 1961  J. J. KURLAND ET AL  2,987,800
METHOD OF MANUFACTURING A MINIATURE CAPACITOR
Filed June 10, 1957  4 Sheets-Sheet 2
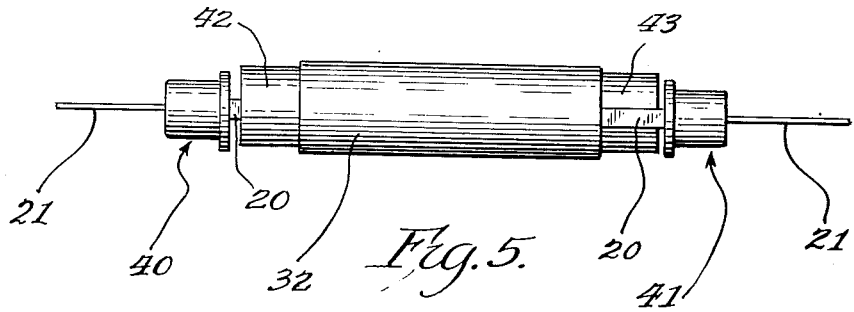
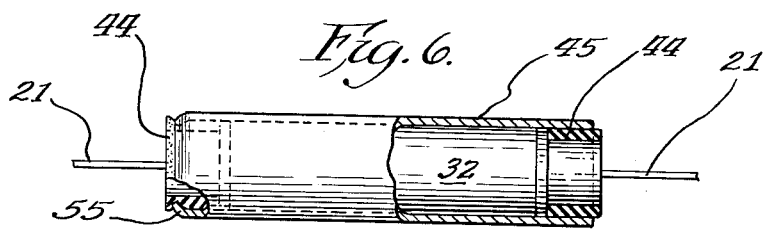
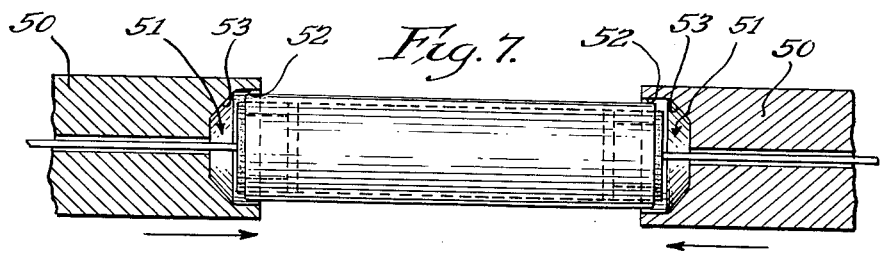
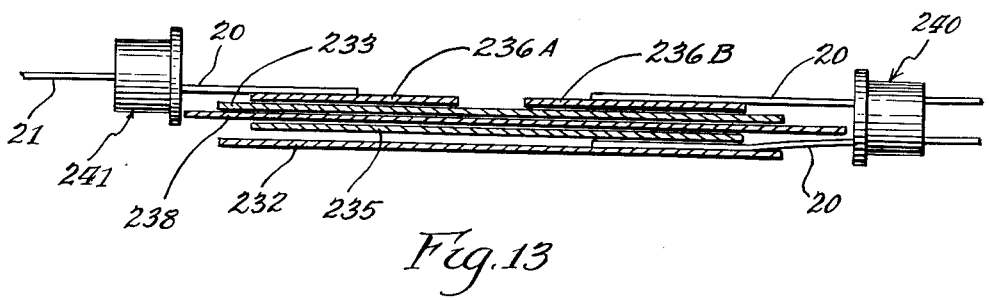
Inventors
Jerome J. Kurland
Joseph J. Kurland
By Mann, Brown & McWilliams,
Attys.

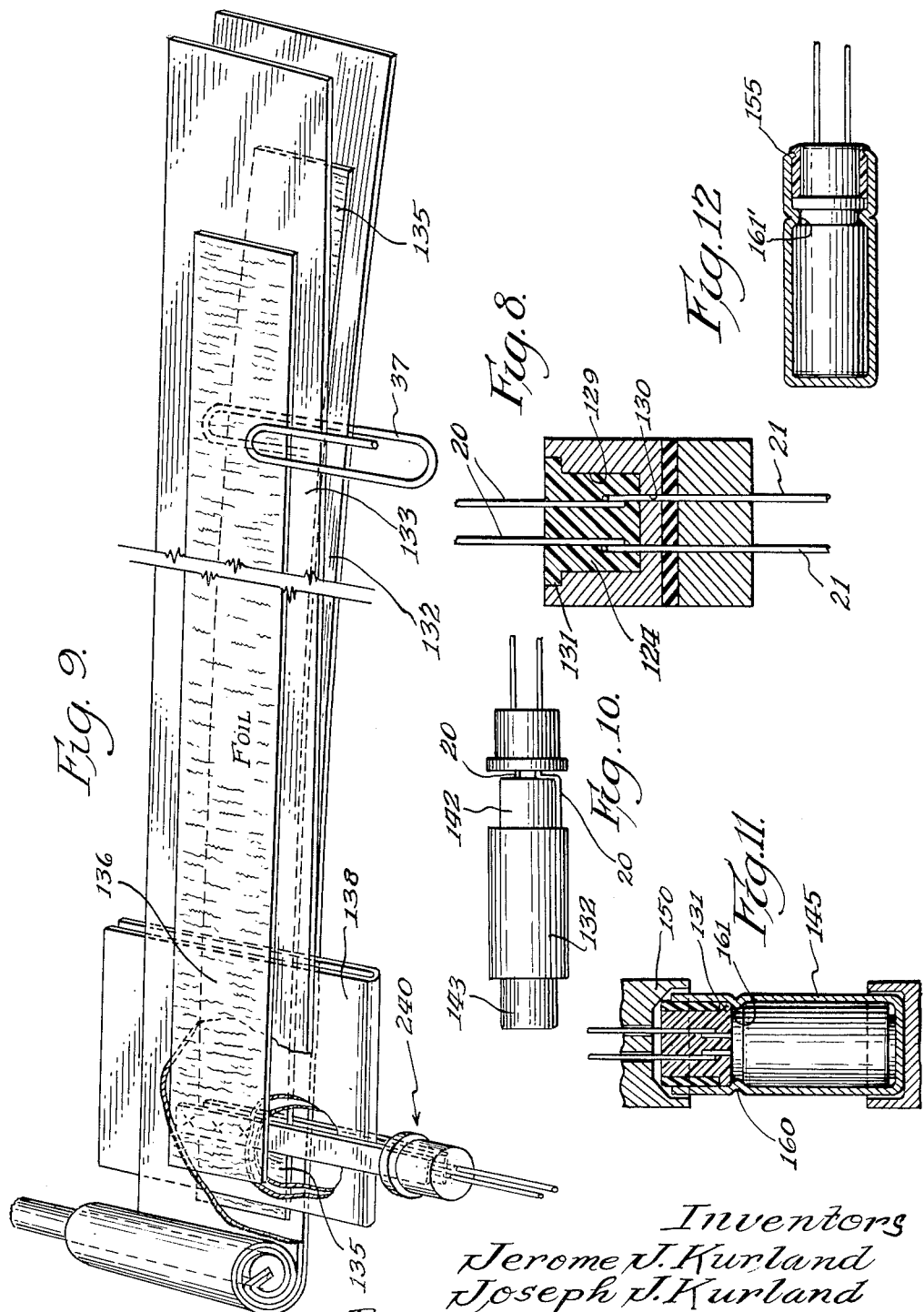

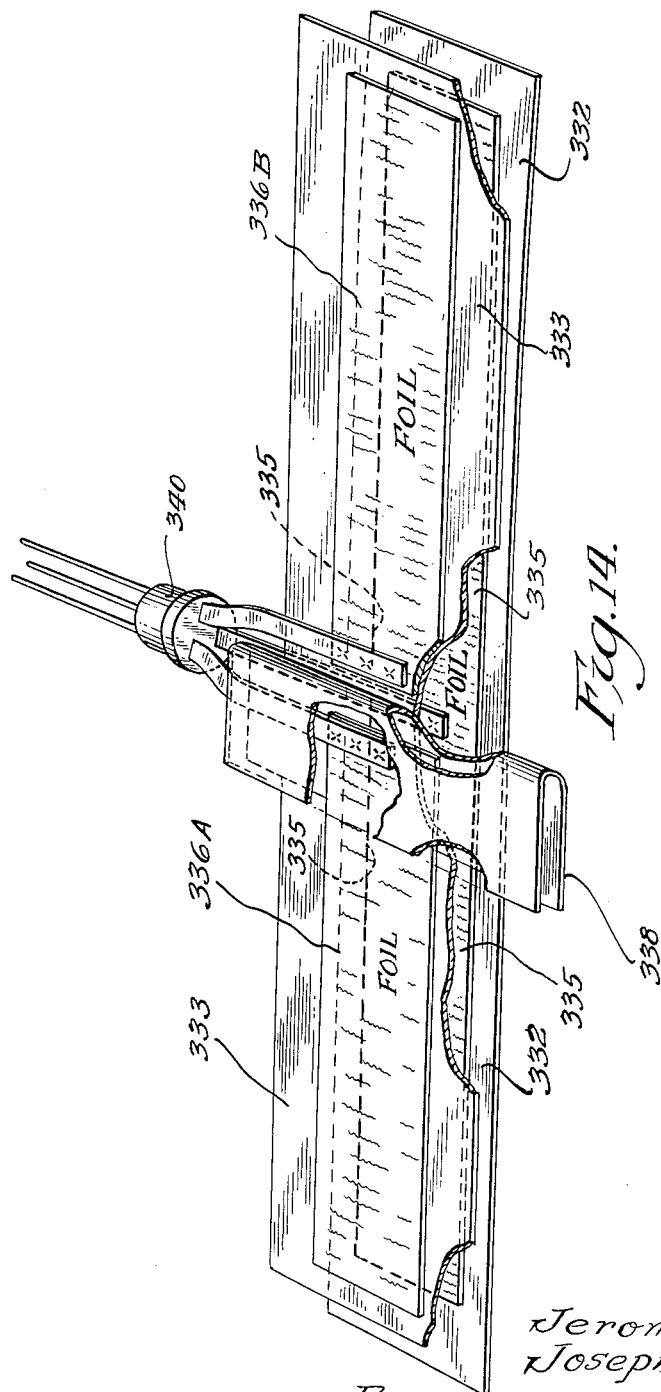

United States Patent Office 2,987,800
Patented June 13, 1961

2,987,800
METHOD OF MANUFACTURING A MINIATURE CAPACITOR
Jerome J. Kurland, Chicago, and Joseph J. Kurland, Glencoe, Ill., assignors to Illinois Condenser Company, a corporation of Illinois
Filed June 10, 1957, Ser. No. 664,537
4 Claims. (Cl. 29—25.31)

This invention relates to miniature capacitor constructions characterized by the excellent sealing provided by their unique terminal structures and characterized by a novel body arrangement that insures against internal short circuits. The invention is also concerned with improvements in the specific procedures and steps in the fabrication of the capacitors and with certain novel devices employed at various stages in the fabrication.

In miniature capacitor constructions, the sizes of the outer casings generally range from 1/8 of an inch to 1 inch in diameter and with these small sizes, unique problems in construction and manufacturing techniques have arisen. These components are finding application in highly important electronic gear where consistent high performance is a necessity, and this must be achieved without excessive manufacturing costs.

The attainment of this goal is the principal object of the present invention.

Other objects and advantages of the invention will become apparent during the course of the following description.

In the accompanying drawings forming a part of this specification and in which like numerals are employed to designate like parts throughout the same, FIG. 1 is a perspective view illustrating a preferred arrangement for joining an external lead wire to a terminal strip or riser;

FIG. 2 is a perspective view of a molding die for forming a solid encapsulation about the juncture of the lead wire and terminal strip to produce a single-conductor type terminal structure;

FIG. 3 is a sectional view through one of the mold cavities of the molding die with the conductor assembly and mold material in place therein;

FIG. 4 is a perspective view, with parts broken away and sectioned, and illustrates the construction of the capacitor body and the procedures employed in preparing the body for winding;

FIGS 5–7 illustrate various stages in the fabrication of the capacitor, with the left end of FIG. 6 illustrating the completed seal construction;

FIGS. 8–12 illustrate the invention applied to a single-ended, double-terminal type capacitor, with FIG. 8 being a sectional view through the mold cavity, FIG. 9 being a perspective view of the capacitor winding, FIGS. 10 and 11 illustrating intermediate stages in the fabrication, and FIG. 12 illustrating the completed capacitor;

FIG. 13 is a sectional view of a capacitor-winding arrangement for a multiple-section capacitor; and FIG. 14 is a perspective view of an alternative form of multiple-section capacitor as it appears prior to winding.

Referring now to the drawings, FIGS. 1–7 illustrate the successive steps in the fabrication of a miniature capacitor of the tubular type; that is, the type wherein a separate terminal is brought out at each end. The first step is to form a juncture between an aluminum riser 20 and a tin-coated copper or brass wire 21. The riser 20 is, preferably, a relatively wide, flat strip that may conveniently be staked to a capacitor foil, although other forms of risers may be employed without departing from the general principles of the invention. Preferably, the juncture is provided by forming a bent-over end portion 22 on the lead wire 21, and with the end portion lying flat against the riser strip 20, the parts are spot-welded to provide a strong mechanical and electrical connection at the juncture.

The metallic conductor assembly of FIG. 1 is then inserted in the molding die 23, as illustrated in FIGS. 2 and 3, for molding a mass of suitable insulating material about the juncture to form a solid, incompressible encapsulation bead 24 that completely envelops and seals the juncture. The molding operation is carried out prior to staking the riser 20 to the capacitor foil. This not only avoids the possibility of damaging the foil, but it simplifies the use of a unitary mold. As shown, the molding die 23 comprises upper and lower die bars 25 and 26 that receive a suitable gasket 27 between their adjacent surfaces, with the parts of the die being fastened by a plurality of screws 28. The die bars may, preferably, be of aluminum, while the gasket may be of hard, rubberlike material.

The molding die is formed with a plurality of vertically-extending passageways which open through the top and bottom surfaces of the die to receive the conductor assembly. The portion of each passageway in the upper part of the top bar is enlarged to form a cavity 29 of the size and shape of the encapsulation bead 24 and constitutes a molding cavity for the bead, while the portion 30 of the passageway at the bottom of the upper bar has a cross section equal in size and shape to the cross section of the lead wire 21 which extends through it, and it cooperates with this lead wire to seal the bottom end of the mold cavity. The gasket 27 also grips the lead wire to exclude air from the mold cavity.

The molds for the molding operation may be of any desired length with as many mold cavities as are desired, so that in mass production, a large number of conductor assemblies are properly positioned in the mold and a suitable liquid casting resin is poured into each cavity to fill each cavity and completely encase the junctures. Any dielectric material which can be cast to provide a hard, solid bead that is resistant to air and moisture and that is chemically inert in the presence of the various types of electrolytes may be employed for encapsulating the juncture, using the mold arrangement shown in FIG. 2. Certain resins, for example, are suitable: the resins known as the epoxy resins, the polyester resins, and phenol and condensation resins. In cases where high temperatures are involved in the molding operation, it is an additional advantage that according to one aspect of the present invention the molding operation, including polymerizing, is completed prior to winding the capacitor body, and this prevents damage to the capacitor body.

While the hereinabove described method and means for pouring offers important advantages in the fabrication of capacitors, it will be understood that the novel capacitor structures disclosed herein may also be fabricated in any other manner known to the art without departing from the scope of the present invention.

Other desirable properties which the encapsulation material preferably should possess are high tensile and shock strength, excellent insulation resistance, stability at high temperatures, and stability in the presence of the various capacitor fill materials and any other materials that are employed in the capacitor fabrication. One or more of these last-mentioned properties may or may not be required, depending upon the particular application, as will be apparent to those skilled in this art.

The illustrated mold cavities are of circular form with the upper portion of the cavity having a slightly greater diameter than the bottom, such that the resultant bead is of smooth, cylindrical shape and is formed with an annular shoulder 31 at one end. The molding process is readily capable of producing an exact and smooth cylindrical surface on the bead, and the perfection of this surface assists in the development of effective sealing pressures in the completed capacitor.

It should be noted specifically that the encapsulated bead might also be formed by familiar compression molding techniques or injection molding techniques.

When the molding of the bead is completed, the encapsulated bead is lifted out of the mold cavity and the cylindrical configuration of the bead readily permits this. The lead wire 21 serves as a convenient handle for the terminal structure while carrying out the next steps of staking the riser strip to an aluminum foil and assembling the various foils between suitable layers of insulation. In winding the capacitor, the ends of a pair of overlying layers 32 and 33 of insulation, which may be paper, are first engaged in a rotatable winding tool 34 and one or two turns are wound for anchoring the insulation layers during the insertion of the foils. In the case of the tubular type of capacitor, the bottom, or outer, capacitor foil 35 is inserted between the insulation layers, with the end of the foil to which the terminal structure 40 is attached adjacent the winding tool, and the upper, or inner, foil 36 overlying the top layer of insulation with its terminal structure 41 at the outer end of the foil and extending in the opposite direction.

During the actual winding operation, it is preferred to secure the parts of the capacitor body at their outer free ends by a suitable fastener 37, which is here shown as a paper clip. The winding tool is actuated to roll up the pack until the paper clip is reached, at which time it is remoed and the winding operation is then completed. The insulation layers 32 and 33 are continuously fed from suitable paper spools and, as each body is wound, the paper layers are snipped so the loose ends may be inserted in the winding tool for the next capacitor. The resultant tubular body is readily removed endwise from the winding tool and, finally, a strip of tape is wrapped about the body to secure it against unravelling during subsequent operations. The specific order of steps in bringing the capacitor to this stage of its fabrication offers important production economies and is believed to be novel.

An additional feature of the invention resides in the use of a separate insulating layer 38 which, as shown, is significantly shorter than the conventional layers of insulation and is somewhat wider. This extra layer is positioned between the bottom foil 35 and the bottom layer of insulation 32 and extends beyond the inner end of the bottom foil so that, when it is wound into tubular form, it will encase the riser for terminal structure 40. The additional layer 38 is of a width such that it projects beyond the edges of the usual layers of insulation to substantially the same extent as the shouldered ends of the beads, the idea being that the additional layer will cover the riser up to the point where the encapsulation bead begins but will not wrap around the bead itself.

FIG. 5 illustrates a completely wound capacitor pack or body formed from the construction shown in FIG. 4. It will be apparent that the tubular projections 42 and 43 formed by the additional layer 38 are substantially coextensive with the exposed portions of the risers. This additional layer, when completely wound, is termed a "capping tube" and, at one end, it encases the riser of the lefthand terminal 40 while the riser of the righthand terminal 41 is completely outside. The capping tube's construction is such that, upon the capacitor body being soaked appropriately, the tubular projections become readily collapsible. This capping tube provides a desirable reinforcement for the center of the capacitor body and projects the risers against rough handling during fabrication but, more importantly, it insulates the risers from contact with either the capacitor foils or the capacitor casing. It will be appreciated by those skilled in the art that the finished capacitor should present a rigid structure, and it is therefore desirable that the terminal beads abut rigidly against the capacitor body. For reasons of convenience in manufacture, however, it is necessary that the beads be spaced outwardly from the edges of the main insulation layers which form the rigid ends of the capacitor body and, therefore, there is a danger of setting up internal short circuits when the risers are collapsed to seat the beads against the ends of the capacitor body. The capping tube projections minimize this danger as they fold between the ends of the capacitor body and the collapsed risers.

After the capacitor body is wound and soaked in a suitable electrolyte, the tubular projections 42 collapse and rubber sleeves 44, preferably having a wall thickness on the order of .050 inch and being of about 80 durometer hardness, are telescoped over the uniform circular portions which form the outer ends of the beads and the entire assembly is inserted in a metallic sleeve 45 which serves as the capacitor casing. The inside diameter of the sleeve 43 is large enough to provide a free-sliding fit with the terminal structures which are forced against the opposite ends of the capacitor body to completely collapse the projections 42 and 43. With the capping tube collapsed and the ends of the beads abutting the capacitor body, the terminal structures will preferably extend slightly beyond the ends of the capacitor casing. The assembly is then mounted in a bumping tool, as shown in FIG. 7.

In the case of a tubular capacitor, the bumping tool includes a pair of coaxial flanging members 50 located in spaced-apart facing relation for relative opening and closing movement to engage and seal the ends of the capacitor. The supporting and guiding structure and control arrangement for the bumping tool have been omitted in the interest of brevity. Each of the flanging members 50 is formed with a socket 51 that is defined by a cylindrical internal side wall portion 52 which merges with an inwardly bevelled side wall portion 53, the bevelled portion converging in an axial direction away from the capacitor. In addition, the flanging members each include an axially extending, open-ended, internal passageway 54 that accommodates the projection of the external lead wire. The cylindrical side wall portion 52 has a diameter slightly larger than the outside diameter of the capacitor casing so that the casing is received within the socket to confine the side walls of the casing during the interval when the flanging pressures are applied by the bevelled surfaces 53.

The capacitor arrangement prior to the flanging operation is illustrated at the right end of FIG. 6, while the completed flange 55 is shown at the left end of FIG. 6. It will be noted that the terminal structure projects slightly beyond the end of the casing in order that the bent over end of the can may properly bite into the rubber sleeve 44. The additional exposed portion of the rubber sleeve is desirable since it increases the surface insulation between the capacitor leads and the capacitor casing. The angle of the bevelled surface 52 is selected to develop the proper flanging action while avoiding impact between the encapsulated bead and the bumping tool.

The wall thickness of the casing is, preferably, on the order of .010 to .015 inch in order to insure that the flange will develop and maintain the required pressures for sealing, although wall thicknesses as low as .008 inch have been successfully employed.

In the present type of capacitor terminal construction wherein a resilient sleeve is seated against the periphery of a rigid encapsulation bead, there are at least three critical sealing areas: (1) the region between the metallic conductor assembly and the terminal bead; (2) the region between the bead and the surrounding sleeve; and (3) the region between the sleeve and the casing wall. The encapsulation bead enhances the sealing in each of these regions. It is molded about the juncture of the riser and external lead wire to completely exclude air and/or electrolyte. In addition, the bead is given a smooth, cylindrical surface of significant size, preferably only slightly less in diameter than the open end of the casing so that the sleeve is compressed between similarly shaped surfaces of comparable size to achieve effective sealing pressures. There is the additional advantage that the bead, which has its maximum depth in the region of the juncture, mechanically reinforces the juncture and protects it from vibration and mechanical and thermal shocks.

The shoulder 31 at the inner end of the bead enhances the sealing action and holds the terminal structure against outward movement. When the bumping tool flanges the ends of the casing inwardly, significant radial pressures are developed and, while these radial pressures are the major sealing forces, pressures are also set up longitudinally through the rubber sleeve to supplement the radial pressures. It will be apparent that as the ends of the can are bent inwardly, they also undergo axial movement and grip the sleeve against the shoulder at the inner end of the bead. Thus, the flanges 55 resist outward movement of the bead and, in this function, are cushioned desirably by the rubber sleeve.

It will be apparent that the miniature capacitor construction offers a more perfect seal, holds the terminal cap securely in place to provide a rigid overall unit, and is substantially free of internal short circuits. High performance characteristics and low manufacturing costs are major advantages of the fabricating techniques and the order in which the various operations are carried out. In brief, the steps in fabricating a miniature capacitor are: (1) Joining the riser to an external lead wire; (2) Molding a solid, rounded encapsulation bead about the juncture; (3) Staking the terminal structures to their respective foils; (4) Assembling the foils between suitable layers of insulation and winding the entire pack simultaneously; (5) Applying the rubber sleeves to the encapsulation beads and inserting the assembly in the outer casing; and (6) Flanging the ends of the casing to compress the sleeves against the beads.

While the invention has been described in relation to miniature capacitors of the electrolytic type, it is generally applicable to other types of capacitors such as electrostatic, wax-or-oil-impregnated, or other comparable devices.

In FIGS. 8-12, various stages of manufacture of a single-ended double terminal, or "standee" type miniature capacitor are shown to bring out certain additional advantages of the techniques and construction of the present invention. The construction of the molded bead itself is generally identical, with the exception that a single bead 124 encapsulates the junctures of a pair of conductor assemblies which, preferably, are formed as per FIG. 1. After the individual conductor assemblies are formed, they are suitably positioned in a molding die, as shown in FIG. 8. In this form of the invention, the die is formed with a divided passageway having an upper common portion 129 that constitutes the mold cavity and divided lower portions 130 that receive the lead wires 21. The junctures are positioned in the mold with the flat portions of the risers 20 in spaced parallel relation, and a suitable liquid casting resin is introduced to fix the parts. When the bead solidifies, it is pulled out of the cavity, as before, and the risers 20 are staked to individual aluminum foils 135 and 136 prior to the winding operation.

The winding operation is carried out in an analogous manner in that the adjacent ends of a pair of overlying layers of insulation 132 and 133 are engaged in a winding tool 34 and one or two turns are formed. The composite foil and terminal structure assembly is then interleaved with the insulation layers, with the bottom, or outer, foil 135 between the layers of insulation and the top, or inner, foil 136 overlying the top layer of insulation 133. Again a suitable fastener 37, such as a paper clip, may be applied to the free end of the pack to hold the parts during the winding operation. An additional layer of insulation 138 of shorter and wider form than the main layers is again inserted at the end of the pack adjacent the winding tool 34, only in this case, this layer is interposed between the bottom foil and the top layer of insulation in order that, when the winding operation is completed, the uppermost riser, as viewed in FIG. 9, will be entirely within the capping tube projection 142, while the lower riser will be outside of it (see FIG. 10). In this "standee" type miniature capacitor, the capping tube projection becomes very important as it is located directly between the otherwise exposed adjacent portions of the risers and thus prevents the risers from shorting out when they are collapsed as the terminal structure 140 is brought against the end of the capacitor body. The capping tube projection 143 at the opposite end of the device effectively spaces the other end of the capacitor body from the bottom end of the casing 145 and thereby eliminates the possibility of one of the foils shorting out against the casing.

In the case of the "standee" type capacitor, the casing is provided with a score groove 160 which provides an annular internal flange 161 against which the shoulder 131 of the encapsulation bead abuts (see FIG. 11). This groove encourages additional yielding of the side wall of the casing when the bumping tool 150 flanges the outer end of the casing so that in the finished capacitor (FIG. 12) a substantial internal flange 161' is provided between the terminal structure and the capacitor body, such that the terminal structure is securely gripped and held rigidly in place between the internal flange 161' and the bent-over outer end 155 of the casing. This construction results in a properly rigid capacitor without however, subjecting the body of the capacitor to severe loading.

FIG. 13 is a sectional view through an unwound capacitor pack for a multiple-section capacitor constructed in accordance with the invention. In this embodiment, a two-part top foil 236A and 236B, the parts being electrically isolated, is shown overlying a common bottom foil 235 with the usual layers of insulation 232 and 233 appropriately interleaved between the foils and an additional layer of insulation 238, of shorter and wider form between the bottom foil 235 and the top layer of insulation 233. Foil sections 235 and 236B are connected through the usual risers 20 to a double-conductor terminal structure 240 while foil section 236A is connected to a single-conductor terminal structure 241.

Terminal structure 241 is formed in the manner indicated in FIGS. 1, 2, and 3, while terminal structure 240 is formed as indicated in FIGS. 1 and 8, whereupon the risers are staked to the various foils and the foils are interleaved with the layers of insulation. The interleaving operation is again carried out while layers 232 and 233 are gripped in a winding tool, with the terminal structure 240 being at the ends of the foils adjacent the winding tool and terminal structure 241 being at the remote end of its foil. The short layer 238 is then inserted to extend between the risers of terminal structure 240, so that, when wound, it encases the riser for foil 236B.

With the parts arranged as indicated in FIG. 13, the pack is wound and the finishing operations are carried out in the same general manner as previously described.

FIG. 14 is a sectional view through an unwound capacitor pack for an alternative form of multiple-section capacitor constructed in accordance with the invention. In this embodiment a two-part top foil 336A and 336B, the parts being electrically isolated and arranged in endwise, spaced-apart relationship, is shown overlying a common bottom foil 335, with the usual layers of insulation 332 and 333 appropriately interleaved between the foils and an additional layer of insulation 338 of shorter and wider form doubled into U-shape and receiving the end of foil 336A which is adjacent to foil 336B. With this construction, the risers for each of the three foils are brought off at the center of the pack to connect the foils to a triple-conductor terminal structure 340.

The triple-conductor terminal structure 340 may be formed in a manner that is generally analogous to the steps indicated by FIGS. 1 and 8 although, of course, a third terminal would be included. After the molding, the risers would then be staked to the various foils and the foils interleaved in the manner indicated in FIG. 14. In interleaving the foils and the layers of insulation, the ends of the insulation layers 332 and 333 are first gripped in a suitable winding tool. The terminal structure and foil assembly are then positioned as indicated in FIG. 14 and the capping-tube forming layer of insulation 338 is positioned. The loose pack is then wound approximately to the mid-point of the common foil 335 so that partial foil 336A is completely encased. An additional turn of the insulation layers is then wound on and, finally, the other partial foil 336B is wound up. The capping layer of insulation 238 again performs the important function of isolating the otherwise exposed portions of the risers. The remaining finishing operations are carried out in the same general fashion as indicated in FIGS. 10, 11 and 12.

It should be understood that the description of the preferred form of the invention is for the purpose of complying with Section 112, Title 35, of the United States Code, and that the appended claims should be construed as broadly as the prior art will permit.

We claim:

1. The method of manufacturing a miniature capacitor of the electrolytic type having a casing having an open end, a wound capacitor body in said casing, said body comprising a plurality of foils in alternating overlapping relation with a plurality of insulation layers, a riser for each foil, and terminal structure means in said casing and sealing the same and including a solid bead of incompressible, insulating material molded about and encasing a portion of said risers; said method comprising: molding said insulating material about said risers, then staking said risers to said foils, then interleaving said foils with said layers of insulation to form a capacitor pack and winding said pack to form a wound assembly.

2. The method of manufacturing a miniature capacitor of the electrolytic type having a casing having an open end, a wound capacitor body in said casing, said body comprising a plurality of foils in alternating overlapping relation with a plurality of insulation layers, a riser for each foil, and terminal structure means in said casing and sealing the same and including a solid bead of incompressible, insulating material molded about and encasing a portion of said risers; said method comprising: molding said insulating material about said risers, then staking said risers to said foils, then interleaving said foils with said layers of insulation to form a capacitor pack and winding said pack to form a wound assembly and inserting said assembly in the open-ended casing and flanging the ends of the side walls of said casing towards said molded material to effect a seal.

3. The method of manufacturing a miniature capacitor of the electrolytic type having a casing having an open end, a wound capacitor body in said casing, said body comprising a plurality of foils in alternating overlapping relation with a plurality of insulation layers, a riser for one of the foils at said open end of the casing, an external terminal mechanically and electrically connected to said riser to form a juncture of dissimilar metals, and terminal structure means in said open end of the casing and sealing the same and including a solid bead of incompressible insulating material molded about and encasing said juncture, said method comprising forming the juncture between said riser and external terminal, molding said insulating material about said juncture, then staking said riser to said one foil, then interleaving said foils with said layers of insulation to form a capacitor pack and winding said pack to form a wound assembly.

4. The method of manufacturing a miniature capacitor of the electrolytic type having a casing having an open end, a wound capacitor body in said casing, said body comprising a plurality of foils in alternating overlapping relation with a plurality of insulation layers, a riser for one of the foils at said open end of the casing, an external terminal mechanically and electrically connected to said riser to form a juncture of dissimilar metals, and terminal structure means in said open end of the casing and sealing the same and including a solid bead of incompressible insulating material molded about and encasing said juncture, said method comprising forming the juncture between said riser and external terminal, molding said insulating material about said juncture, then staking said riser to said one foil, then interleaving said foils with said layers of insulation to form a capacitor pack and winding said pack to form a wound assembly, then inserting said assembly in the casing to dispose the mold material in the open end thereof, and completing the seal between the mold material and the casing.

References Cited in the file of this patent

UNITED STATES PATENTS

| | | |
|---|---|---|
| 2,211,780 | Jacobs | Aug. 20, 1940 |
| 2,297,608 | Blackburn | Sept. 29, 1942 |
| 2,375,211 | Brennan | May 8, 1945 |
| 2,393,966 | Brennan | Feb. 5, 1946 |
| 2,527,373 | Parson | Oct. 24, 1950 |
| 2,580,668 | Franz | Jan. 1, 1952 |
| 2,604,661 | Karns | July 29, 1952 |
| 2,694,433 | Fulton et al. | Nov. 16, 1954 |
| 2,695,443 | Wagner | Nov. 30, 1954 |
| 2,704,880 | Brennan | Mar. 29, 1955 |
| 2,758,491 | Buchanan | Aug. 14, 1956 |
| 2,769,944 | Stein et al. | Nov. 6, 1956 |

FOREIGN PATENTS

| | | |
|---|---|---|
| 498,815 | Belgium | Apr. 20, 1951 |